Oct. 18, 1927.
C. A. BARRY
1,646,342
HITCH
Filed Sept. 24, 1926
2 Sheets-Sheet 2
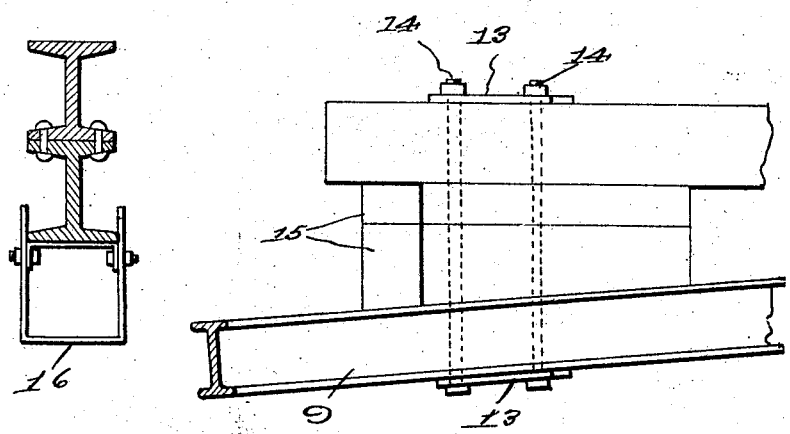
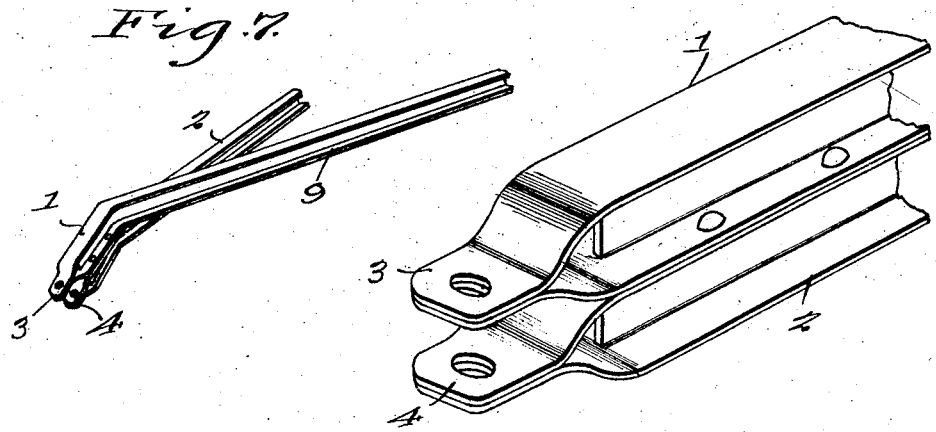

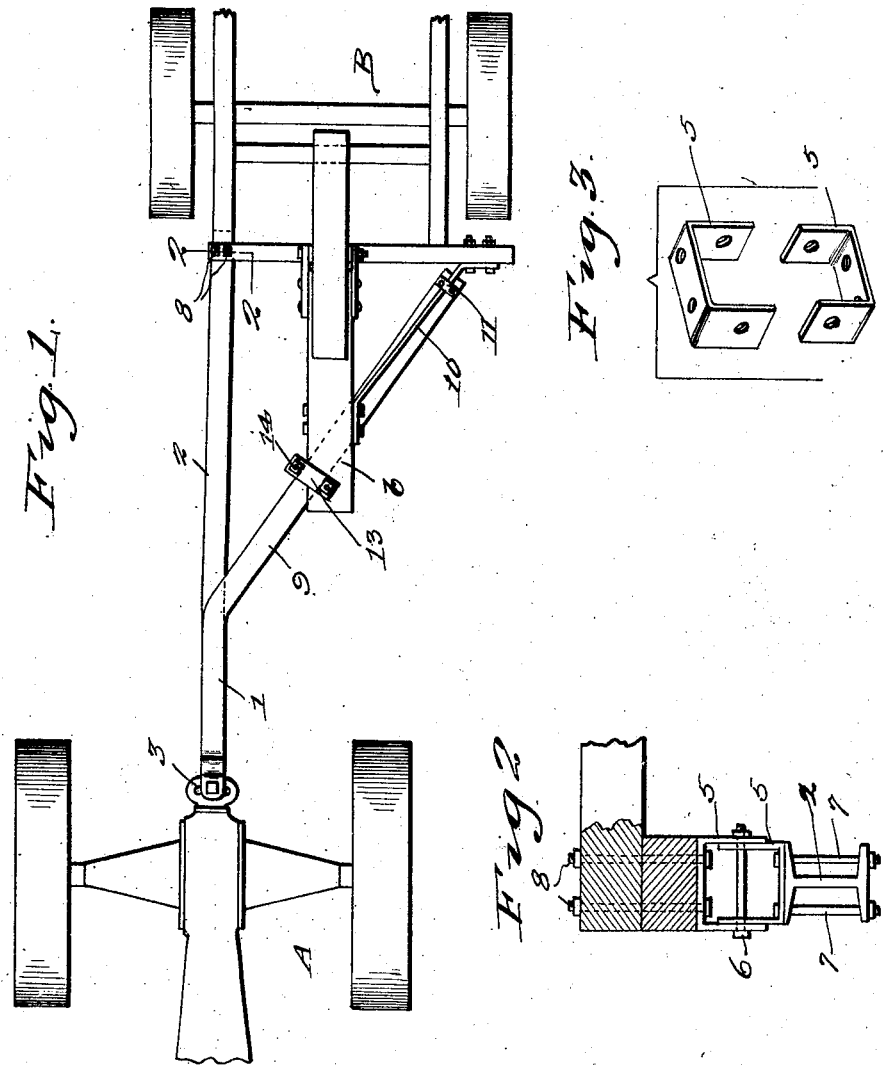

Patented Oct. 18, 1927.

1,646,342

UNITED STATES PATENT OFFICE.

CARL A. BARRY, OF SUTHERLAND, IOWA.

HITCH.

Application filed September 24, 1926. Serial No. 137,580.

This invention has reference to an improved hitch for connecting a tractor to an implement such as a corn picker in a manner whereby the tongue truck can be eliminated and the weight formally carried by such truck carried by the tractor and also wherein the tractor is permitted to travel over that part of the field which has already been passed over by the implement and the general object of the invention is to simplify and improve the construction upon which I was granted U. S. Letters Patent No. 1,568,867.

To the attainment of the foregoing the invention consists in the improvement as hereinafter described and definitely claimed.

In the drawings:

Figure 1 is a plan view showing the manner of attaching the hitch to the tractor.

Figure 2 is a sectional view on the line 2—2 of Figure 1.

Figure 3 is a view of the bracket for connecting the hitch to a part of the implement.

Figure 4 is a transverse sectional view through the hitch to illustrate the swingable bail associated therewith for supporting the hitch on the ground when detached from the tractor.

Figure 5 is a side view showing the means for connecting the hitch to the short tongue of the implement.

Figure 6 is a perspective view of the front end of the hitch.

Figure 7 is a perspective view of the front portions of the members constituting the hitch.

In these views A indicates a tractor and B a corn picker or other implement.

In carrying out my invention I provide two beams which are of I-beam construction. The forward ends of these beams are straight, as indicated by the numerals 1 and 2, and are disposed one over the other and the contacting flanges thereof are riveted or otherwise secured together. The ends 1 and 2 of the beams have their web cut away at the ends thereof and their horizontal flanges bent into contacting engagement with each other to provide ears 3 and 4 that have aligning openings therethrough for the reception of means for connecting the beams to the draw bar of the tractor. The rear slightly angled end of the underlying beam 2 is pivotally connected with the right hand side of the picker by U-shaped brackets 5—5, a pin 6 forming a hinge connection between the beam and picker. One bracket 5 is bolted to the top of the beam by bolts 7, and the other bracket is bolted to the pivot by bolts 8 with the limbs of one bracket overlapping the limbs of the other and the bolt 6 passes through holes in the said limbs.

The beam 1 has an angle end 9 which is fastened to a brace 10 by clamps 11 and the said beam is also fastened to the short tongue $b$ of the implement by clamping plates 13 and bolts 14. Blocks 15 are placed between the tongue $b$ and beam and these blocks are beveled so that the tongue can be adjusted toward and from the beam by moving one block upon the other.

Pivotally secured to the hitch there is a substantially U-shaped yoke 16 that provides a rest for the hitch when the same is disconnected from the tractor.

My present device it will be noted, dispenses with a number of parts made use of in the construction mentioned by my U. S. Patent No. 1,568,867, and thereby materially simplifies and improves the said construction. The simplicity of the hitch and the advantages thereof will, it is thought, be apparent to those skilled in the art to which such invention relates so that further detailed description thereof is not thought necessary.

Having described the invention, I claim:—

In combination with a tractor and an implement to be drawn thereby, said implement having a cross beam and a centrally disposed tongue, draft means comprising a pair of I-beams connected together from one end to an intermediate point, one of the beams being straight and the other being bent laterally and rearwardly at an angle to the straight beam, said beams having means for connecting them to a tractor, and means for connecting them to the implement, said latter means comprising a brace extending from the tongue to the cross beam, clamps connecting the angle beam to the brace, beveled blocks having a sliding connection forming a connection between the tongue and angled beam, and a hinge connection between the straight beam and cross beam.

In testimony whereof I affix my signature.

CARL A. BARRY.